United States Patent

Abel

[15] 3,637,921

[45] Jan. 25, 1972

[54] LUMINANCE AMPLIFIER WITH BLACK LEVEL STABILIZATION CONTROL

[72] Inventor: Dennis G. Abel, Hanover Park, Ill.

[73] Assignee: Zenith Radio Corporation, Chicago, Ill.

[22] Filed: Jan. 9, 1970

[21] Appl. No.: 1,650

[52] U.S. Cl. .................178/5.4 R, 178/7.5 DC, 178/DIG. 12

[51] Int. Cl. ........................................H04n 9/12, H04n 5/16

[58] Field of Search ....................178/7.5 DC, 7.3 DC, 7.1 R, 178/7.2 R, 5.4 R, DIG. 12

[56] References Cited

UNITED STATES PATENTS

| | | | |
|---|---|---|---|
| 3,102,163 | 8/1963 | Sennhenn | 178/7.2 |
| 3,249,694 | 5/1966 | Loughlin | 178/7.5 |
| 3,315,033 | 4/1967 | Sennhenn et al. | 178/7.1 |
| 3,515,804 | 6/1970 | Foote | 178/7.3 |

*Primary Examiner*—Richard Murray
*Assistant Examiner*—Peter M. Pecori
*Attorney*—Donald B. Southard and John J. Pederson

[57] ABSTRACT

A luminance amplifier circuit with black level stabilization control for a color television receiver wherein a variable DC control signal is derived from an applied composite video signal, the magnitude of which is directly dependent upon the white content of the instantaneous received signal. The derived DC control signal upon combining with the alternating components at the input of the luminance amplifier maintains a true DC level for the processed luminance signal as applied to the image display tube under varying signal input levels to aid DC operating characteristics of the luminance amplifier device.

5 Claims, 3 Drawing Figures

PATENTED JAN 25 1972

3,637,921

SHEET 1 OF 2

Inventor
Dennis G. Abel
By [signature]
Attorney

Inventor
Dennis G. Abel
By [signature]
Attorney

LUMINANCE AMPLIFIER WITH BLACK LEVEL STABILIZATION CONTROL

BACKGROUND OF THE INVENTION

This invention relates in general to control circuitry for color television receivers and in particular to black level stabilization control for the luminance amplifier wherein a variable DC control signal is derived from the composite video signal as a function of the white content of the instantaneous received signal and applied to the input of the luminance amplifier to maintain a true DC level output so as to stabilize the black level of the televised image at a specific desired reference.

In color television receivers, the various shade or brightness levels of the televised image correspond to the brightness components of the luminance signal which, along with the chrominance signal, define the picture information of the transmitted image. The brightness information of the televised image is transmitted by the luminance signal which is amplitude modulated on a main carrier while the information necessary to reproduce the color content in the image is transmitted by a phase and amplitude modulated subcarrier wave. The electron beams in the receiver's image display tube are varied in intensity according to the detected modulation of the luminance and chrominance signals. In addition, suitable viewer-adjustable controls are customarily provided in the television receiver whereby a particularized contrast and brightness setting may be selected according to viewer preference.

It is customary that the black level in the televised image correspond to the cutoff of the image reproducer. Accordingly, progressively greater intensities of the electron beams produce progressively lighter shades. However, the luminance signal which determines the brightness content of the televised image may be comprised primarily of alternating current components as derived by the detector circuitry. Even in those instances where there is a measure of DC coupling from such detector circuitry to the input of the luminance amplifier, the DC components of the luminance signal coupling may be degraded or otherwise restricted due to the nature of the processing circuitry as well as to other factors. Moreover, the luminance amplifier itself, in combination with the various associated circuit elements, may well permit a degradation or undesirable shift in the desired DC characteristics intended for the luminance channel. The effect is that the DC level in the processed luminance signal is not properly maintained, or at least is not properly represented therein, such that, upon application to the cathodes of the image display tube, the black level is shifted to some undesirable reference. This leads to less than faithful halftone reproduction on the screen of the image display tube. Grey tones can be lost simply because they are beyond the cutoff of the display tube. In other instances, blacks may appear as greys on the image screen. In addition, failure to hold the proper DC level at the image reproducer may well give rise to the condition known as "focus blooming" by virtue of overdriving the image display tube, or more correctly, the electron beams therein.

Accordingly, some provision is desirable to maintain the black level of the televised image at some stabilized reference. This may be conveniently accomplished by insuring that the level of the DC components in the luminance signal is properly maintained before application to the cathodes of the image reproducer so that all signals are maintained at the proper relation above cutoff thereof. Various systems are of course known in the art for accomplishing this objective and take various forms and configurations. For example, an arrangement commonly known as a DC restorer circuit may be employed which usually includes a clamping element of some sort. One such prior DC restoration circuit incorporates a diode and a capacitor in the input circuit of the video amplifier, and wherein the diode is negatively biased by a potential derived from the automatic gain control stage of the television receiver.

However, this arrangement cannot be employed for color television receivers where the brightness control must be located in the input circuit of the luminance amplifier instead of the control grid of the image reproducer. Other control circuits are less than fully satisfactory because they derive a DC control signal based on some averaged DC level rather than the true DC level. All such prior arrangements simply ignore the operational characteristics of the luminance amplifier itself.

Accordingly, it is an object of the present invention to provide a new and improved luminance control circuit in a color television receiver having provision for black level stabilization and which effectively overcomes the deficiencies and disadvantages of the prior circuits.

A more particular object of the present invention is to provide a luminance control circuit in a color television receiver having circuit means to effectively stabilize the black level of the televised image at a particular reference notwithstanding variations in the DC coupling between detection and luminance amplifier circuitry as well as any variances that may occur in the DC gain characteristics of the luminance channel over a wide range of input signals.

Another object of the present invention is to provide a luminance control circuit of the foregoing type to effect and maintain a true DC level in the luminance signal as applied to the cathodes of the image reproducer which need not rely upon a clamping circuit arrangement and which does not utilize an averaged DC level.

Still another object of the present invention is to provide a luminance control circuit of the foregoing type for deriving variable DC control potential from an applied composite video signal which, upon application to the input of the luminance amplifier, provides an instantaneous DC level in accordance with varying luminance signal requirements.

Yet another object of the present invention is to provide a luminance control circuit of the foregoing type which maintains a true DC level in the processed luminance signal as applied to the image reproducer and wherein an otherwise apparent reduction in brightness of a televised image in the presence of noise impulses is effectively prevented.

In accordance with the present invention, a luminance control circuit for a color television receiver comprises a signal source for producing a luminance signal having amplitude variations representative of an image to be reproduced and a luminance signal translating channel, including an amplifier device, for translating the luminance signal to an image reproducer. The control circuit further includes circuitry for deriving and combining a DC control signal with alternating current components of the luminance signal at the input of the luminance amplifier device so as to maintain a true DC level for the luminance signal as applied to the cathodes of the image reproducer. This DC control signal is derived from the composite video signal obtained from a second signal source and has a derived value dependent upon the white content of the instantaneous received video signal. The applied DC control signal at the input of the luminance amplifier device effectively compensates for any undesirable variations in DC characteristics thereof that may otherwise occur in the operating parameters of the luminance amplifier over a range of input signal levels. In effect, a variable DC control potential is provided at the input of the luminance amplifier device to insure a stabilized black level notwithstanding variations in DC coupling to the luminance amplifier or in the DC operational characteristics of the amplifier device itself over a wide range of input signal levels.

The features of the present invention which are believed novel are set forth with particularly in the appended claims. The invention itself, however, will best be understood by reference to the following description taken in conjunction with the drawings, in which:

Figure 1:
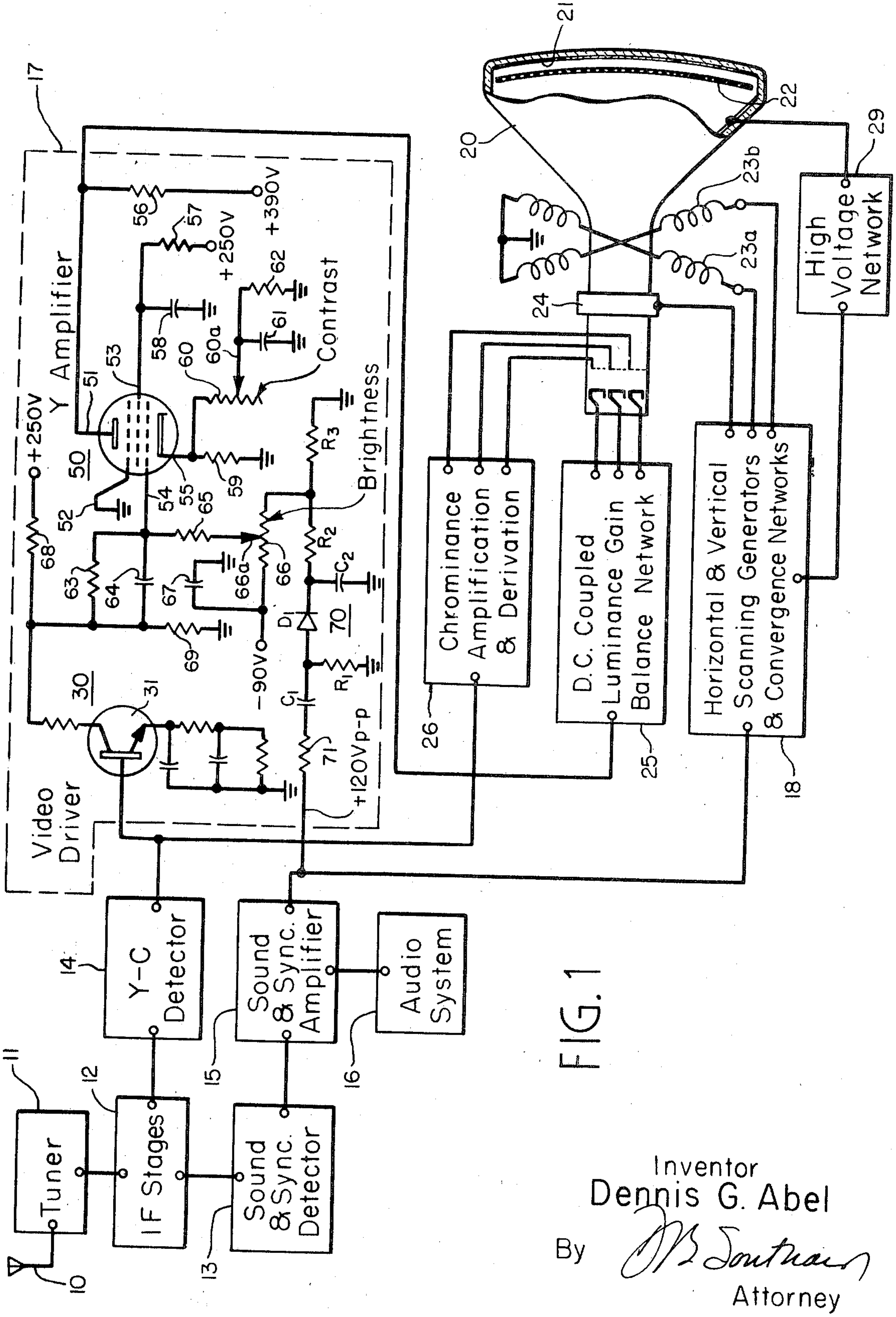
FIG. 1 is a diagram of a television receiver, partially in schematic and partially in block diagram form, which illustrates a luminance control circuit embodying the present invention.

Referring now to the drawings, a television receiver is shown in FIG. 1 which embodies the present invention. As there represented, an antenna 10 is coupled to the input circuit of a tunable radiofrequency amplifier and first detector stage 11. The output therefrom connects through an intermediate-frequency amplifier stage 12 to a sound and sync detector stage 13 as well as a luminance (Y) and chrominance detector (C) stage 14. Detector stage 13 in turn connects to a sound and synchronizing signal separator and amplifier stage 15 which, in turn, connects to an audio system 16 and horizontal and vertical scanning generators and convergence networks 18. Generating network 18 includes the usual circuitry for developing horizontal or line and vertical or field deflection signals which are applied to appropriate deflection yokes positioned about a cathode-ray tube 20 serving as the image reproducer or picture tube.

The color tube 20, which is a conventional shadow mask picture tube, includes tricolor image screen or target 21 to be scanned by a group of three electron beams developed by individual guns housed within the tube itself. A parallax mask 22 is included in the color tube 20 to restrict the electron beams generated in the guns in a known manner so that each beam is permitted to impinge only upon phosphor dots of a single color on image target 21. Horizontal and vertical scanning generators and convergence networks 18 are also coupled to a convergence yoke 24 which is positioned about the tube neck to insure proper convergence of the beams at the tube screen. The remaining components of the tube, including the electron lens system, have been omitted as they form no part of the subject matter proper of the present invention and because the details of such remaining structure and components, as well as the operation thereof, are well known in the art.

The three cathodes of the electron guns are coupled to a DC coupled color balance network 25 which connects to the luminance (Y) channel 17 which will be explained more fully hereinafter. The control electrodes of the guns are coupled to a chrominance amplification and processing network 26 which is also coupled to the Y–C detector stage 14. The previously mentioned deflection yokes comprise coils 23*a*, 23*b*, which are appropriately driven by the horizontal and vertical scanning generator network 18. A suitable high-voltage operating potential is applied to the screen 21 and mask 22 of the tube 20 by regulated high-voltage supply network 29 which is also coupled to network 18.

As thus far described, the television receiver is entirely conventional so that only a brief description of its operation need be considered here. The received color telecast intercepted by the antenna 10 is selected by appropriate adjustment of the tunable stages of RF amplifier and first detector 11 wherein it is amplified and converted to an appropriate intermediate-frequency signal which is amplified in amplifier 12. The intermediate-frequency signal is then applied to the Y–C detector 14 and to sound and sync detector 13. The output signal of detector 14 is applied to the Y amplifier channel 17 to develop a luminance signal which is applied to the luminance gain balance network 25 and from there to the cathodes of the electron guns of the picture tube 20.

The output signal from the sound and sync detector 13 concurrently drives audio sound system 16 in known fashion to produce the audio program accompanying the telecast and is used to control the vertical and horizontal sweep circuits of generator network 18. Accordingly, appropriate synchronizing scanning signals are developed and applied to the deflection yokes 23*a*, 23*b* of the picture tube 20 to deflect electron beams emanating from the guns which impinge across the target electrode 21 to develop the usual image raster thereupon.

Since the electron beams are suitably modulated by the luminance information from detector 14 and by chrominance information from the network 26, their traverse of target 21 under the influence of the deflection fields of the scanning yoke results in the reproduction of a visual image. Since the parallax electrode or shadow mask 22 enables each electron beam to see but a single color phosphor on its traverse of target 21, the reproduction is in fact that of three image fields effectively superposed to yield an image in simulated natural color. The necessary final anode voltage and focus voltage are supplied by the regulated high voltage supply 29 to tube 20 as required for its operation in the reproduction of images.

More particular consideration may now be given to that portion of the receiver constituting a luminance control circuit embodying the present invention. This control circuit comprises a signal source, such as Y–C detector 14, for providing a luminance signal having amplitude variations representative of an image to be reproduced. As previously mentioned, there is a luminance channel for translating the luminance signal to image reproducer 20. This channel may be thought of as amplifier stage 17 and luminance gain balance network 25. It includes an amplifier device, e.g., in this case, an electron discharge tube here shown as pentode amplifier 50. The anode or plate 51 of the amplifier 50 is suitably energized by a positive potential through a load resistance 56. Its screen electrode 53 is energized by a positive potential supplied through resistance 57 which is bypassed by a capacitor 58. The suppressor grid 52 is directly grounded while the cathode electrode 55 is connected to ground through a resistance 59. A potentiometer 60 is connected in parallel with cathode resistance 59 as shown, with its adjustable center tap 60*a* connected to ground through a resistance 62 and bypassed by a capacitor 61. Potentiometer 60 serves as the adjustable contrast control for the television receiver in a known manner.

The first grid electrode 54 of the pentode amplifier 50 serves as the control electrode for the amplifier 50 to which the luminance signal is applied for amplification and then DC coupled to the cathodes of the image reproducer 20 through luminance gain balance network 25. The luminance signal is applied to grid 54 through a resistance 63-capacitance 64 network coupled to the preceding video driver stage 30, in turn coupled directly to the Y–C detector stage 14. With the incorporation of transistor 31 as the active amplification element in the video driver, there of course will be some degree of DC coupling from the Y–C detector stage 14 to the input of the luminance amplifier 50 such that DC components will be present along with the derived AC components. However, the coupling that would otherwise be present is substantially reduced or restricted by the presence of the RC network 63–64 by virtue of its specific time constant.

To complete the circuitry of the luminance amplifier device 50, a fixed resistance 65 is connected from the control grid 54 to the center tap 66*a* of a potentiometer 66, one end of which is connected to a source of negative voltage, on the order of 90 volts as shown, and bypassed by a capacitor 67. The other end of the potentiometer 66 is connected to ground through a resistance R3. Potentiometer 66 serves as the adjustable brightness control for the television receiver by varying the fixed bias as applied to the control grid 54 according to the preference of the viewer.

The brightness control is preferably included in the input of the luminance amplifier for the color television receiver rather than at the control element or grid of the image reproducer as customarily provided in a monochrome receiver. This is because there are three such control electrodes in a color image reproducer which are selectively controlled in accordance with the chrominance signals developed and applied through network 26.

As thus far described, it will be noted that the luminance signal is derived from the Y–C detector stage 14 and coupled to the input of the luminance amplifier 50 through video driver 30. The luminance signal is then amplified in amplifier 50 and applied to the cathodes of the image reproducer 20. However, without more, the black level will not be maintained at the desired reference for all amplification levels of the applied luminance signal. This results from the aforementioned degradation in DC coupling by virtue of the specific time constant through RC network 63–64. In addition, undesirable variations in the operating DC characteristics of the amplifier 50 itself may occur on relatively high white signal input levels. This may be readily understood by reference to the operational considerations of amplifier 50.

Upon the application of a luminance signal having a high white content, resulting in a strong positive going signal applied to the control grid 54, the amplifier 50 is driven into high conduction. The resulting increased anode current is reflected across the cathode resistance 59 which develops a voltage acting as a bias restricting the level of amplification for the tube 50. Moreover, the increased current through amplifier 50 also causes a voltage drop at the screen electrode 53 from what it was before. This is because the screen load resistance 57 is at a relatively high value or impedance level whereby significant voltage drops are developed thereacross with significant increases in current levels. Accordingly, where a luminance signal derived from the Y–C detector stage 14 and applied to the input of the luminance amplifier 50 through video driver stage 30 is of a value which would ordinarily effect a given change in anode voltage, the actual voltage change may very well be restricted to some lower value because of the foregoing factors. The result is that the black level is shifted from the desired reference and less than faithful halftone reproduction is realized as well as creating a susceptibility to the condition of "focus blooming" under certain operating parameters.

To counteract the foregoing disadvantages, a control circuit 70 is provided to effect black level stabilization regardless of signal input level or white content in the applied composite video signal as well as varying degrees of DC coupling through the RC network 63–64. Black level stabilization circuit 70 includes a rectifying device, such as the diode D1, a resistance R1 connected in shunt therewith from the anode to ground, and a capacitor C2 connected between cathode and ground in combination with a pair of serially connected resistances R2 and R3 connected in parallel with capacitor C2, as shown. This network 70 is coupled to a source containing the composite video signal, such as sound and sync amplifier stage 15, through a serially connected capacitor C1 and a resistance 71. The level of the composite video signal at this point is a positive going voltage on the order of 120 volts peak-to-peak. The junction of resistances R2 and R3 is connected to one end of potentiometer 66 and thus coupled to the input of amplifier 50 through center tap 66*a* and resistance 65.

Figure 2:
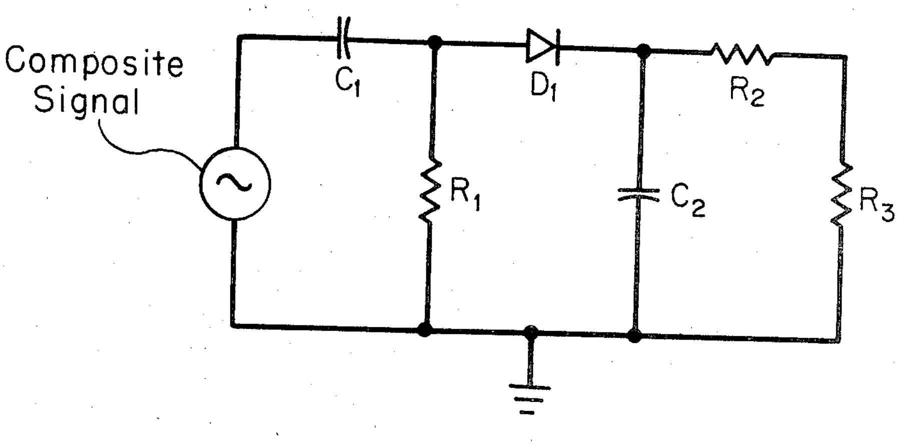
FIG. 2 is a simplified circuit diagram of a portion of the luminance control circuit shown in FIG. 1.
Figure 3:
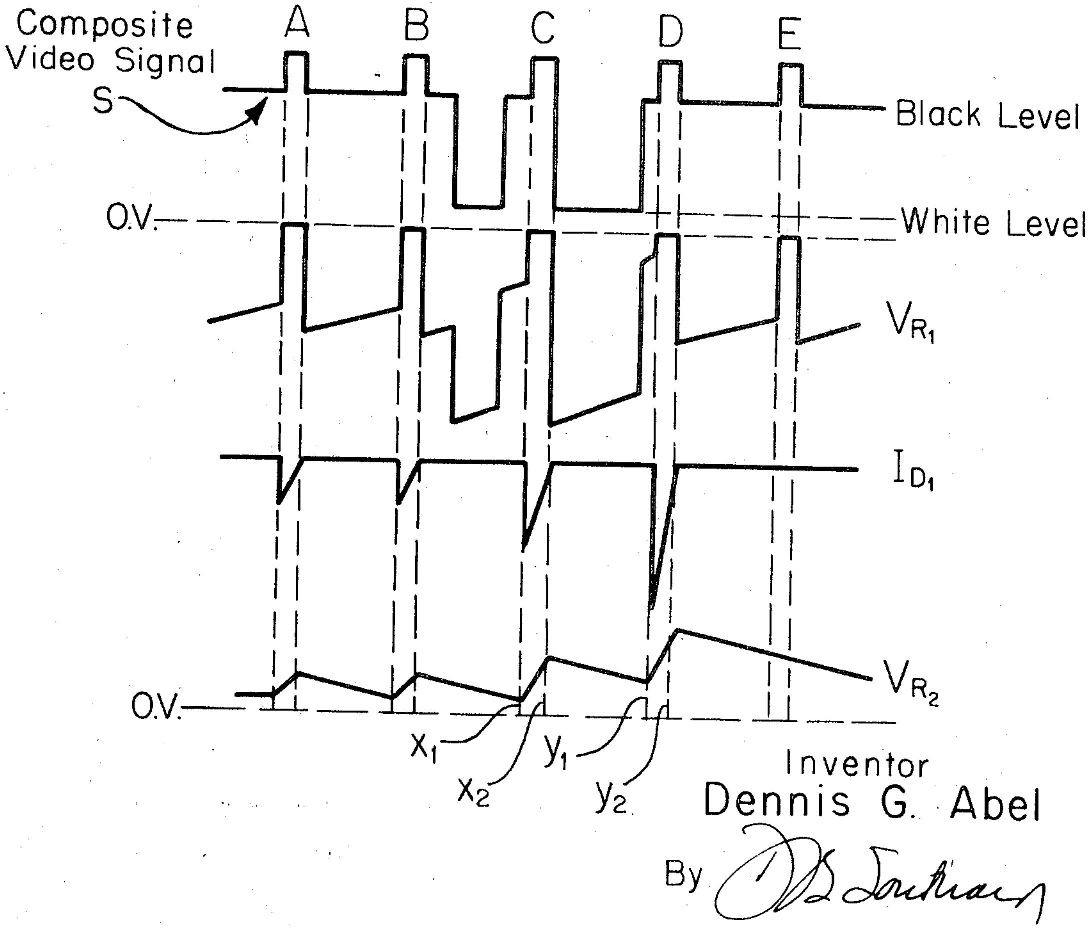
FIG. 3 illustrates various wave forms developed by the circuit elements of FIG. 2 which are useful in understanding the operation of the luminance control circuit.

The operation of the control circuit 70 may be more readily appreciated upon reference to the simplified diagram set forth in FIG. 2 taken in conjunction with the wave forms depicted in FIG. 3, the latter being somewhat exaggerated in form in the interests of better understanding.

As shown in FIG. 2, the composite video signal is applied on the anode side of the diode D1 through capacitor C1. A representative composite video signal S is shown as the top waveform in FIG. 3 having a series of cycles as represented by the references A through E. The diode D1 is initially biased to conduct on a portion of the composite video signal sync tips, i.e., the conduction threshold is set above the black level as shown in FIG. 3. With the diode D1 conducting on the sync tips, a certain voltage will be built up or accrue on the capacitor C1 by virtue of the time constant of capacitor C1 and resistance R1. However, upon a substantial white level occurring on a particular cycle of the composite video signal, such as between positions B and C or between positions C and D (FIG. 3), the capacitor C1 will be forced to discharge to a greater extent through resistance R1. Consequently, upon the occurrence of the next sync tip pulse, such as at position C, diode D1 will be caused to conduct at a higher level in order for capacitor C1 to reach the same charged level as before. The higher conduction level of diode D1 in this instance will effect a higher current through the network comprising capacitor C2 and resistances R2 and R3, and in turn, a higher voltage drop thereacross. In particular, the voltage drop $V_{R2}$ across resistance R2 connected between the diode D1 and the brightness control potentiometer 66 (FIG. 1) reflects an increase in the level of an essentially positive DC potential developed thereacross. This is illustrated in FIG. 3 at X1–X2, representing the length or duration of the sync tip pulse at position C. As shown, the current $I_{D1}$ through diode D1 increases following the occurrence of a significant amount of white level in a preceding picture line, which in turn causes a higher DC voltage $V_{R2}$ to be developed across resistance R2. If the following line also contains a significant amount of white level, such as indicated between positions C and D, diode D1 again conducts at a heavier level than where the composite video signal has significantly less brightness information, such as between positions A and B in FIG. 3. In this instance, diode D1 conducts at the higher level as shown at Y1–Y2 (FIG. 3) and the potential developed across resistance R2 rises to an even higher DC level.

The positive DC potential as selectively developed across resistance R2 is effective upon application to the grid 54 of amplifier 50 to reduce the bias thereof in such a manner that the proper DC level is maintained for the luminance signal and the proper cathode voltage, or black level, is maintained at the image reproducer 20. Proper selection of the various components, such as resistances 65, 63, 68 and 69, effects the desired magnitude of black level compensation. While it may be noted that some variations in the DC potential applied to the control grid 54 from resistance R2 will occur with changes in the setting of potentiometer 66, it has been found that the magnitude of change, for all practical purposes, is at a level where it may be ignored.

By way of illustration, but no sense to be construed as a limitation or restriction of the present invention, the following component values and types were employed for the circuit 70 and associated voltage divider network at the input of amplifier 50 in FIG. 1:

| | | |
|---|---|---|
| resistor 71 | ohms | 100K |
| capacitor C1 | microfarads | 0.1 |
| resistor R1 | ohms | 240K |
| diode D1 | | silicon diode |
| capacitor C2 | microfarads | 0.1 |
| resistor R2 | ohms | 240K |
| resistor R3 | ohms | 240K |
| potentiometer 66 | ohms | 1M |
| capacitor 67 | microfarads | 0.01 |
| resistor 65 | ohms | 470K |
| resistor 63 | ohms | 390K |
| capacitor 64 | microfarads | 0.1 |
| resistor 68 | ohms | 82K |
| resistor 69 | ohms | 3.3K |
| amplifier device 50 | | type 12HL7 |

One further characteristic of control circuit 70 should be mentioned at this point, i.e., the immunity thereof with respect to ambient noise signals. Normally, ambient noise pulses present in the composite video signal will appear on the cathode-ray tube screen as black noise. As such, the eye of the viewer integrates this with the picture such that the overall brightness appears somewhat reduced. However, in the present instance, the noise impulses on the composite video signal as applied to the control circuit 70 will cause a random conduction level for diode D1 and in turn a higher DC potential across resistance R2. This reduces the negative bias on the control grid 54 of amplifier 50, which in turn increases the brightness level of the televised image. By appropriate selection of the impedance interposed between the source of composite video signal and circuit 70, such as resistance 71, the foregoing reduction in apparent brightness level of the reproduced image in the presence of noise impulses is conveniently and effectively offset by the controlled increase in the brightness level thereof resulting from the rectification of such noise impulses through circuit 70 and application to the input of amplifier 50. To that extent, the brightness level of the televised image is rendered immune to noise such as may be generated by electric motors and the like.

While only a particular embodiment of the invention is shown and described herein, it will, of course, be understood that other variations and modifications may be effected without departing from the true scope and spirit of the present invention. The appended claims are intended to cover all such modifications and alternative constructions that fall within such true scope and spirit.

I claim:

1. In a television receiver, a luminance amplifier with black level stabilization control for deriving and maintaining a true DC level in the luminance signal applied to an image reproducer, comprising in combination:

a first signal source for providing a luminance signal having amplitude variations representative of an image to be reproduced;

a luminance signal translating channel including an amplifier device for translating said luminance signal to the image reproducer, said amplifier device having an input coupled to said first signal source and an output adapted for direct coupling to the image reproducer;

a second signal source for providing a composite video signal at a predetermined level;

circuit means coupled to said second signal source for deriving a control signal having DC components in accordance with the white content of the instantaneous composite video signal; and means coupling said derived DC control signal to said input of said amplifier device for combining with the signal from said first signal source prior to amplification and application to the image reproducer.

2. A luminance amplifier circuit with black level stabilization control for a television receiver in accordance with claim 1 wherein the first signal source comprises the luminance and chrominance detection circuitry and the second signal source comprises the sound and sync detection and amplification circuitry.

3. A luminance amplifier circuit with black level stabilization control for a television receiver in accordance with claim 1 wherein said circuit means includes rectifying means poled to conduct on a portion of the sync tip pulses of the composite video signal, said rectifying means being coupled to the second signal source through a first capacitance and shunted by a first resistance connected from the anode side to a reference potential, said circuit means further including a second capacitance connected from the cathode side of said rectifying means to said reference potential in parallel with a pair of serially connected second and third resistances.

4. A luminance amplifier circuit with black level stabilization control for a television receiver in accordance with claim 3 wherein the means for coupling the derived DC control signal to the input of the luminance amplifier device includes a variable voltage divider network comprising a potentiometer serving as the brightness control which is connected at one end thereof to the junction of said second and third resistances and at its other end to a source of bias potential with the adjustable center tap being coupled to the input of the amplifier device.

5. A luminance amplifier circuit with black level stabilization control for a television receiver in accordance with claim 1 wherein said circuit means further includes means for offsetting an apparent reduction in brightness in the televised image on the image reproducer in the presence of noise impulses, said last mentioned means comprising impedance means interposed between said circuit means and the second signal source to limit the increase in the derived DC control signal developed by said circuit means in the presence of noise impulses to a predetermined value.

* * * * *